United States Patent
Taugbøl

(10) Patent No.: US 11,716,331 B2
(45) Date of Patent: Aug. 1, 2023

(54) AUTHENTICATION METHOD, AN AUTHENTICATION DEVICE AND A SYSTEM COMPRISING THE AUTHENTICATION DEVICE

(71) Applicant: OFFPAD AS, Fornebu (NO)

(72) Inventor: Petter Taugbøl, Oslo (NO)

(73) Assignee: OFFPAD AS, Fornebu (NO)

( * ) Notice: Subject to any disclaimer, the term of this patent is extended or adjusted under 35 U.S.C. 154(b) by 191 days.

(21) Appl. No.: 16/631,042

(22) PCT Filed: Jul. 11, 2018

(86) PCT No.: PCT/NO2018/050184
§ 371 (c)(1),
(2) Date: Jan. 14, 2020

(87) PCT Pub. No.: WO2019/013647
PCT Pub. Date: Jan. 17, 2019

(65) Prior Publication Data
US 2020/0145418 A1    May 7, 2020

(30) Foreign Application Priority Data
Jul. 14, 2017 (NO) .................................. 20171177

(51) Int. Cl.
*H04L 29/06* (2006.01)
*H04L 9/40* (2022.01)
*G06Q 50/26* (2012.01)

(52) U.S. Cl.
CPC ........ *H04L 63/0876* (2013.01); *H04L 63/083* (2013.01); *H04L 63/0861* (2013.01); *G06Q 50/265* (2013.01)

(58) Field of Classification Search
None
See application file for complete search history.

(56) References Cited

U.S. PATENT DOCUMENTS 8,220,063 B2   7/2012  Ting
8,738,934 B2 * 5/2014  Lurey .................. G06F 21/602
                                          713/193
(Continued)

FOREIGN PATENT DOCUMENTS

EP    2290626 A2   3/2011
EP    2541978 A1   1/2013
(Continued)

OTHER PUBLICATIONS

Plugthingsin ("Plug Things In—How Does Tethering Work", author unknown, found at http://www.plugthingsin.com/internet/mobile/tethering/, author unknown, accessed on Nov. 1, 2021, published on Nov. 12, 2015) (Year: 2015).*

(Continued)

*Primary Examiner* — Piotr Poltorak
(74) *Attorney, Agent, or Firm* — Dinsmore & Shohl LLP

(57) ABSTRACT

An authentication method for a user to access service providers through an online enabled device, an offline authentication device configured to authenticate a user to service providers through online enabled devices, and a user authentication system comprising a authentication device, an online enabled device and online service providers.

25 Claims, 6 Drawing Sheets

(56) References Cited

U.S. PATENT DOCUMENTS

| | | | |
|---|---|---|---|
| 8,973,091 B2 | 3/2015 | Ting et al. | |
| 9,436,818 B1 | 9/2016 | Tooley, II | |
| 9,848,324 B1* | 12/2017 | Abene | H04W 12/068 |
| 2002/0162009 A1* | 10/2002 | Shmueli | G06F 21/31 |
| | | | 726/15 |
| 2004/0123113 A1* | 6/2004 | Mathiassen | G07F 7/1008 |
| | | | 713/185 |
| 2006/0075227 A1* | 4/2006 | Park | H04L 9/0894 |
| | | | 713/193 |
| 2007/0011724 A1* | 1/2007 | Gonzalez | G06F 21/34 |
| | | | 713/184 |
| 2007/0056025 A1* | 3/2007 | Sachdeva | H04L 63/0853 |
| | | | 726/5 |
| 2008/0118041 A1* | 5/2008 | Finogenov | H04L 12/2876 |
| | | | 379/93.02 |
| 2010/0058064 A1 | 3/2010 | Kirovski et al. | |
| 2010/0269152 A1* | 10/2010 | Pahlavan | H04L 63/0853 |
| | | | 715/740 |
| 2012/0047566 A1* | 2/2012 | Andersson | G06F 21/32 |
| | | | 726/19 |
| 2012/0096542 A1* | 4/2012 | Shea | G06F 21/34 |
| | | | 726/16 |
| 2013/0133042 A1 | 5/2013 | Mercredi et al. | |
| 2013/0205360 A1* | 8/2013 | Novak | H04L 63/0884 |
| | | | 726/1 |
| 2013/0268767 A1* | 10/2013 | Schrecker | G06F 21/31 |
| | | | 713/185 |
| 2013/0314208 A1 | 11/2013 | Risheq et al. | |
| 2014/0040628 A1* | 2/2014 | Fort | H04L 63/18 |
| | | | 713/182 |
| 2014/0317708 A1* | 10/2014 | Adrangi | H04W 12/06 |
| | | | 726/7 |
| 2014/0337634 A1* | 11/2014 | Starner | H04W 12/33 |
| | | | 713/186 |
| 2015/0096001 A1* | 4/2015 | Morikuni | H04L 63/123 |
| | | | 726/7 |
| 2015/0281211 A1* | 10/2015 | Jøsang | H04L 63/083 |
| | | | 726/5 |
| 2015/0281229 A1 | 10/2015 | Kang et al. | |
| 2016/0135738 A1* | 5/2016 | Bowers | A61B 5/7282 |
| | | | 600/595 |
| 2017/0230363 A1* | 8/2017 | Deutschmann | H04W 12/065 |
| 2017/0359338 A1* | 12/2017 | Tschofenig | G06F 21/44 |
| 2018/0004928 A1* | 1/2018 | Hayashi | H04L 63/0853 |
| 2018/0005244 A1* | 1/2018 | Govindarajan | G06Q 20/40 |
| 2018/0047014 A1* | 2/2018 | Maus | H04L 63/0853 |
| 2019/0014107 A1* | 1/2019 | George | H04L 67/146 |

FOREIGN PATENT DOCUMENTS

| | | |
|---|---|---|
| WO | 2007107868 A2 | 9/2007 |
| WO | 2016097685 A1 | 6/2016 |

OTHER PUBLICATIONS

Steve Sanderson's Blog found at https://blog.stevensanderson.com/2008/08/25/using-the-browsers-native-login-prompt/, Aug. 25, 2008) (Year: 208).*

Passpack (Passpack Online Password Manager for Workgroups, "Passpack Administration: Getting Started Guide", found at www.passpack.com, author unknown, Oct. 2010) (Year: 2010).*

Klevjer et al., "Extended HTTP Digest Access Authentication", Conference: IFIP WG 11.6 Working Conference on Policies & Research in Identity, DOI:10.1007/978-3-642-37282-7_7 (Year: 2013).*

Varmedal et al., "The OffPAD: Requirements and Usage", NSS 2013, LNCS 7873, pp. 80-93 (Year: 2013).*

Migdal et al., Demo: OffPAD-Offline Personal Authenticating Device with Applications in Hospitals and e-Banking, HAL open Science, ACM CCS 2016, Vienna, Austria, hal-01589899 (Year: 2016).*

International Search Report dated Oct. 9, 2018; International Application No. PCT/NO2018/050184.

* cited by examiner

AUTHENTICATION METHOD, AN AUTHENTICATION DEVICE AND A SYSTEM COMPRISING THE AUTHENTICATION DEVICE

CROSS-REFERENCE TO RELATED APPLICATIONS

This application is the U.S. national stage of PCT/NO2018/050184 filed Jul. 11, 2018, which claims priority of Norway Patent Application 20171177 filed Jul. 14, 2017, of which is hereby incorporated by reference in its entirety.

FIELD OF THE INVENTION

The present invention relates to an authentication method, an authentication device, and a user authentication system.

BACKGROUND OF THE INVENTION

Current methods of user authentication do not enable a user to securely authenticate to a service provider through an open web client computer without the user physically interacting on the client computer.

Henning Klevjer. "Requirements and Analysis of Extended HTTP Digest Access Authentication". Master Thesis, Department of Informatics, University of Oslo, June 2013 demonstrates a user authentication mechanism using an authenticating device, building on an extension of the HTTP Digest Access Authentication scheme. The authenticating device facilitates unobtrusive and automated authentication, while still adhering to password policies. The authenticating device acts as a trusted platform external to the terminal from which the user may authenticate to services and manage his online identities. The authenticating device is used to authenticate its holder to any supported web service to which he or she is registered. The document also discuss how identity management can be more user-centric, thus user friendly, alleviating the cognitive load of managing passwords.

Md. Sadek Ferdous, Audun Jøsang:"Entity Authentication & Trust Validation in PKI using Petname Systems" discloses (Petname) recognition of identities and certainty about identity ownership which are crucial factors for secure communication in digital environments. Identity Management Systems have been designed to aid users as well as organisations to manage different user identities. However, traditional Identity Management Systems provide little support on the user side to manage organisational identities. This causes vulnerabilities that open up for serious attacks such as identity theft and Phishing. Petname Systems have been proposed for managing organisational identities on the user side in order to improve the user friendliness and to strengthen security. Other authentication methods or systems are known from solutions provided by Imprivata, a provider of secure authentication in hospitals, see U.S. Pat. No. 8,220,063 (B2), U.S. Pat. No. 8,973,091 (B2) US2013133042 (A1) and U.S. Pat. No. 8,220,063 (B2).

Known methods of user authentication without physical user interaction on client computers, requires that the client computer is a terminal dedicated to a particular service (payment terminal for example) or to a closed network (face recognition, contactless batch authentication on hospital IT systems). An ability for users to securely authenticate to a service provider through an open web client computer without the user physically interacting on the client computer, would improve both security and usability of user authentication.

A user ID is associated with a method for how it should be used. Methods for user authentication to online services impose user sequences which a user must fulfil in order to convey his/her user identity to the service. Be it typing a password on a computer, swiping a contactless card in front of a reader, presenting a fingerprint to a sensor, or other. An invention which can split that dependency (of the method of conveying the user ID and the user ID itself) and not impose such relationships can enable more users to participate in the online society (e.g. the current methods limit inclusion to online services for users with different forms of physical disabilities), reduce digital illiteracy through improved/personal adaptations, and enable service providers to reach new user groups.

No current Methods viably empower a user to enable secure service provider authentication on a user-controlled security platform.

The consumerisation of devices is a well-documented and strong industry trend. Users will generate huge amounts of personal data from an ever-increasing range of consumer devices. The smartphone is the best example of such a data-generating consumer device, but also wearables and a range of dedicated devices for various health conditions are entering the market. The users' abilities to exercise control of the personal data generated on such devices are limited. In most cases the consumer device requires the user to establish a user ID to a service provider in order to access his/her personal data. An invention which would enable users of consumer devices to share/associate personal data generated on the device with a user ID which is freely chosen by the user would improve privacy protection of personal data, enable health service providers to utilize data from a wider range or sources thereby improving efficiency and quality of treatment.

It is an object to overcome the problems with the known solutions by introducing an authentication device and a method of its use according to the present invention.

SUMMARY OF THE INVENTION

It is one object of the invention to provide an authentication method, an authentication device and a user authentication system, which.

In one embodiment of the invention it is provided an authentication method for a user to access service providers through a client computer comprising the steps of:
a) authenticating the user to an authentication device;
b) sending a Uniform Resource Locator (URL) of the service provider and user credentials to authentication device communication software on the client computer;
c) sending a request message to open the service provider URL, from the authentication device, where the message includes service provider URL;
d) sending the service provider request message to the service provider;
e) on the service provider executing an authentication procedure;
f) logging in the user on the service provider.

In one aspect of the invention step a can further comprise the steps of:
choosing a service provider from a list of service providers stored in a memory on the authentication device; and
triggering an access command on the authentication device into the client computer.

In one aspect of the invention step a can further comprise the step of: the user selecting "register user" on a menu on the authentication device. Step a can further comprise the step of by the user: presenting a user code on the authentication device, where the user code can be any of: PIN-code, Password (PW) or biometrics.

In one aspect of the invention step a can further comprise the step of at the authentication device: storing the user input in the memory of the authentication device.

In one aspect of the invention step e further comprises the steps of:

generating from a service provider web on the client computer or from applications on the client computer a service provider request message.

In one aspect of the invention step i further comprises the steps of:

returning a user logged in message to the service provider web on the client computer or applications on the client computer, and from the service provider web on the client computer or applications on the client computer displaying a logged in confirmation onto a display means of the client computer.

The access command can be transferred to the client computer using one or more of: Near Field Communications (NFC), Local Area Network (LAN), Bluetooth (BT) and Universal Serial Bus cable (USB), cable.

In one aspect of the invention step c above further comprises to send the request message to open the service provider URL, from the authentication device, where the message includes service provider URL, using one or more of: NFC, LAN, BT, USB, cable.

In another embodiment of the invention it is provided an authentication device for authentication on client computers without physical interaction on the client computer, comprising:
a) an input interface,
b) an output interface,
c) a memory, and
d) a processor, wherein the memory device holds a list of service providers and the output interface includes client computer communication means.

In one aspect of the invention the input interface further comprises data input means such as one or more of: a keyboard with real mechanical keys, a keyboard with soft keys or a touch screen. The input interface can further comprise data input means such as one or more of: biometric sensors, such as face recognition "sensors" iris sensor, fingerprint sensors or a microphone.

In one aspect of the invention the output device at least comprises one of: display units, touch screens, loudspeaker or LED's.

In one aspect of the invention the memory can be an insertable memory chip. The memory can be configured to store lists of preferred service providers with associated credentials and to store user credentials and user credential associated with individual service providers.

In one aspect of the invention the processor is configured to process data and to route data between I/O-units and to communicate with client computer.

In yet another embodiment of the invention it is provided a user authentication system including an authentication device, a client computer and an online service provider, where:

a) the authentication device at least comprises an input interface, an output interface, a memory, and a processor, and b) the client computer at least comprises an input interface, an output interface, a user device communication module, service provider applications, and internet connection means.

In one aspect of the user authentication system the input interface can further comprise data input means such as one or more of: a keyboard with real mechanical keys, a keyboard with soft keys or a touch screen. The input interface can further comprise data input means such as one or more of: biometric sensors, such as face recognition "sensors" iris sensor, fingerprint sensors or a microphone.

In one aspect of the user authentication system the output device at least comprises one of: display units, touch screens, loudspeaker or LED's.

In one aspect of the user authentication system the processor can be configured to process data and to route data between I/O-units and to communicate with client computer.

Other advantageous features will be apparent from the accompanying claims.

BRIEF DESCRIPTION OF DRAWINGS

Following is a brief description of the drawings in order to make the invention more readily understandable, the discussion that follows will refer to the accompanying drawings, in which.

DETAILED DESCRIPTION OF THE INVENTION

Figure 1:
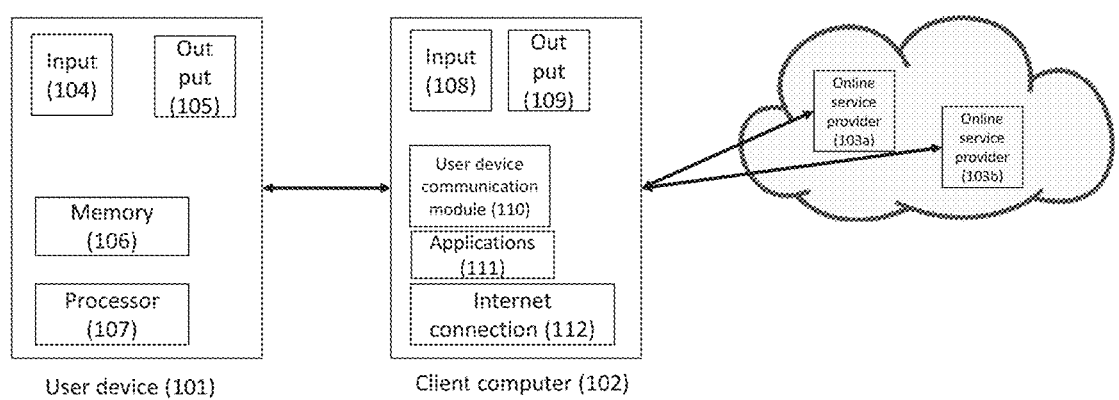
FIG. 1 shows a block diagram, of an authentication system.

In the following it is firstly disclosed general embodiments in accordance with the present invention, thereafter particular exemplary embodiments will be described. Where possible reference will be made to the accompanying drawings and where possible using reference numerals in the drawings. It shall be noted however that the drawings are exemplary embodiments only and other features and embodiments may well be within the scope of the invention as described.

The present invention relates to a decoupled device—portable authenticating device 101—in the hands of a user, it supports mutual authentication between user and server, as well as user-centric identity management, i.e. secure and usable management of digital identities and credentials on the authenticating device rather than in the user's brain. The authenticating device 101 supports management and authentication of both user and service provider identities. It can operate offline and contain a secure element, to protect its contents and the privacy of the user.

The portable authenticating device 101 is not connected to Internet. A user of the portable device can select a service/application from a list of secure services and retrieve their stored user identity to this service, and exchange this information with an online terminal (smartphone, PC) that then establishes a logged-on connection between the service and the user based on received data from the device. This means that a user irrespective of the online terminal he/she operates from he/she can access services, even services which requires user identification and user authentication on the internet from said terminal. Necessary login information is transferred from the portable user device to the online terminal using some kind of near field communication such as NFC, LAN or Bluetooth. Hence an entire login sequence has been moved from the online terminal to the portable device, including the user's choice of service. This results in a safer process as the portable authenticating device is a separate stand-alone device which is offline, hence not being prone to hacking or any attack over wireless communication lines. The user only relates to the portable device for login to a service, 'offline login'. The portable device is user-controlled thus it is the user who selects the services and user identities stored in the device. The device is used for logon to services that use open online platforms.

The portable authenticating device 101 provides offline login which increases security because a user does not provide secrets (passwords) on online terminals (which are exposed to malware) and because the identity of the service provider is stored in a user-controlled device that is offline and is not exposed (the device is a ' Trusted device'). Therefore, a user is sure that it specifies the password of the service and not an attacker who claims to be the service.

According to the present invention, the authentication device 101 replaces the user as the input 'operator' to the client computer 102. On the authentication device 101 the user selects the service provider to which it wants to log in, from the list of stored service providers. When the user has selected service provider, the authentication device 101 collects from its memory the service provider credential (URL) and the user credentials (username, password, OTP, certificate or other). The authentication device 101 prepares a message to be sent from the authentication device 101 to the client computer 102, the message containing the service provider credential (URL), and the user credentials. The user authenticates to the authentication device 101 before the authentication device sends information to the client computer 102. The user authentication triggers an access command, whereby the authentication device sends the message to the client computer. Thus, the authentication device becomes a user's service selector, on which the user selects which service he/she want to log into, and where the log-in sequence on the client computer is performed without the user interacting on the client computer.

In the following the authentication device 101 and the use of it will be described in detail, with reference to the figures.

Figure 2:
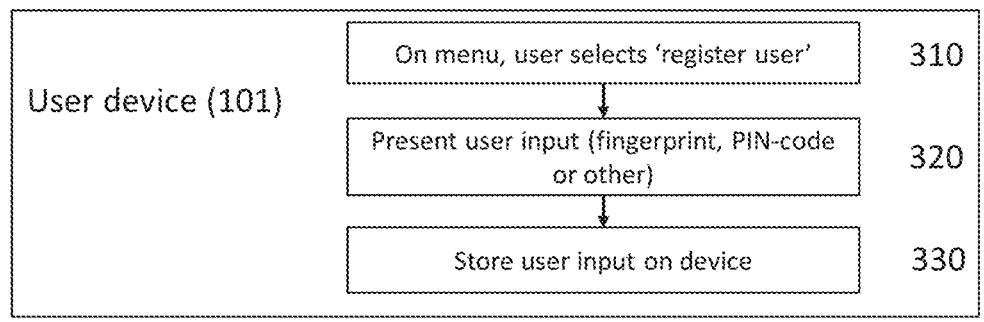
FIG. 2 shows a personalisation sequence of an authenti- cation i.e. a first step in the initialisation of an authentication device.
Figure 3:
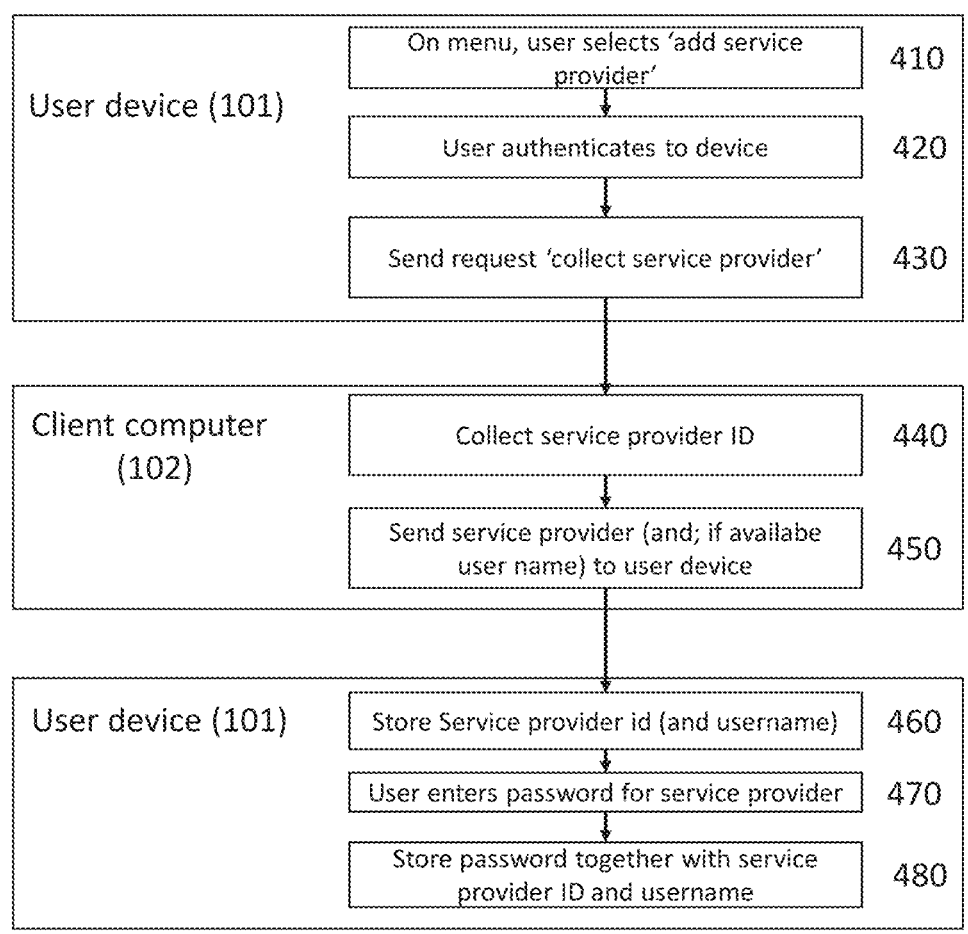
FIG. 3 shows a second step of the initialisation procedure of the authentication device, including adding user credentials and service provider credential.
Figure 4:
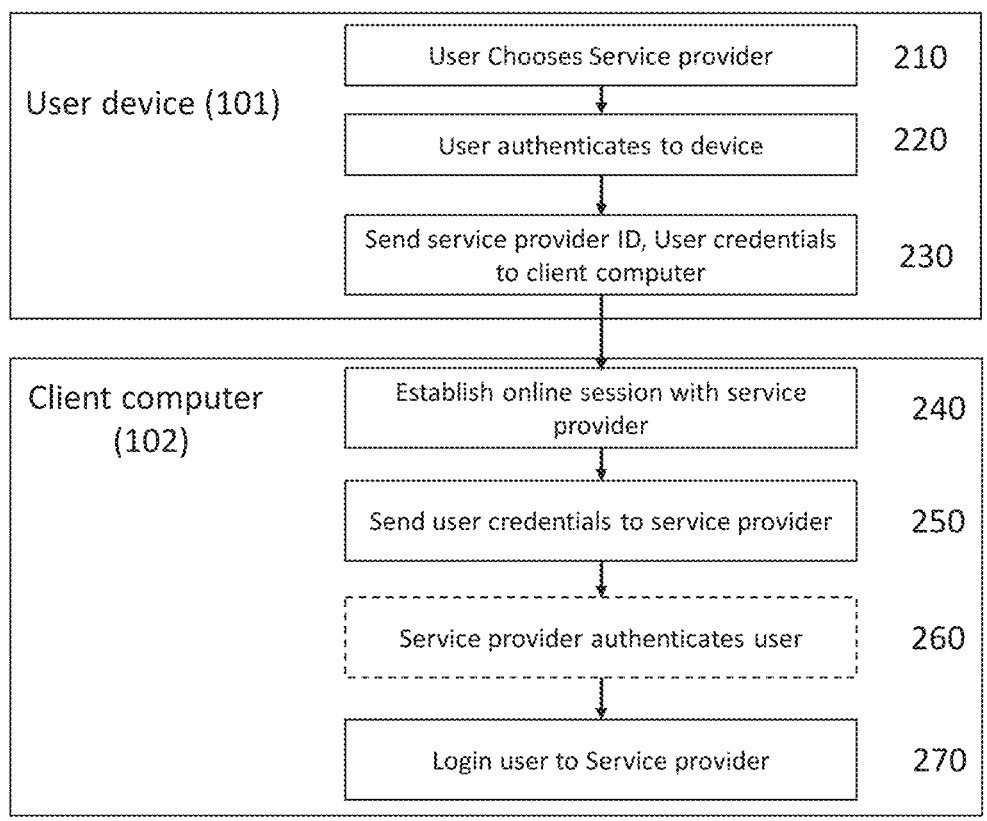
FIG. 4 shows a sequence for user log-in on a authentication device.

The elements of the system are indicated in FIG. 1. While method steps for use is indicated in FIG. 2-4 whilst FIG. 5 goes into more detail with respect to signalling between units.

FIG. 1 shows an example of active devices in a scenario where the authentication device 101 according to the present invention is used. The authentication device 101 comprises data input means 104. The data input means can comprise a keyboard with real mechanical keys with soft keys or it can be a touch screen or a combination thereof. Moreover the data input means can comprise biometric sensors, such as face recognition "sensors" iris sensor, fingerprint sensors etc. the input data means can also comprise a microphone.

The authentication device 101 further comprises output data means 105. The output means can comprise display units, touch screens, loudspeaker, LED's etc.

The authentication device 101 can comprise an internal memory 106. The memory can be an internal memory, or it can be an insertable memory chip or a combination thereof. The memory will store lists of preferred service providers with associated credentials, it will store user credentials and user credential associated with individual service providers.

The processor 107 of the authentication device 101 processes data and routes data between I/O-units and communicates with client computer 102.

The authentication device 101 has communication capabilities configured to communicate with a client computer 102, for example through a wired interface such a USB-interface, and/or through wireless interfaces such as Bluetooth and/or NFC.

Before a user can take advantage of the direct authentication between the authentication device 101 and an arbitrary client computer 102, a user must set up the device. Set up before regular use includes two distinguished steps, a first initialisation step (ref FIG. 2) and a second step (FIG. 3) where the user credentials and service provider credential are registered. The first initialisation step includes personalising the authentication device 101.

According to FIG. 2, the personalisation procedure starts when the device is powered, whereby the user selects from a menu, displayed on the output data means 105, a function for personalisation, for example called 'registration' (310).

320: the user is then requested to enter a set of user credentials. The user credentials can be in the form of minutia of one or more biometric data (such as fingerprints), of a PIN code and/or passwords and/or voice samples.

330: The authentication device can collect and store one or multiple user credentials of the user. The authentication device can be personalised to multiple users.

A second step in the initialisation procedure is to register in the authentication device the user credentials and service provider credentials for the services to which the user wants to log-in. This second step is repeated for each service. This second step may be performed in its entirety on the authentication device 101, in its entirety on the client computer 102, in a process implemented on the user device communication module 110, or in a combination of the two. According to FIG. 3, a procedure for user- and service provide-credentials registration on the authentication device is described where

410: On the authentication device, the user selects from a menu a function for adding a service provider, e.g. 'add service provider'. Thereafter, if the user is not authenticated to the authentication device,

420: the user authenticates to the authentication device

430: the authentication device generates and sends an 'add service provider'—request to the user device communication module 110 on the client computer 102.

440: On the client computer 102, the user is requested to execute a procedure defined by the user device communication module 110 for entering user credentials (e.g. username and password) and service provider credentials (URL). This procedure may collect all or part of the data from portable applications 111 (browser or app) or by requesting the user to type in the data.

450: The user device communication module 110 executes the 'add service provider'—request, and sends to the portable apparatus 101 the response.

460: The authentication device checks the received data and stores the received data. If the data received does not complete the add service provider request, 470: the user is requested to complete the request by entering data on the authentication device, for example the password.

480: The authentication device stores the data of the completed 'add service provider request'.

FIG. 4 shows a step-by-step authentication and service provider access initiated by a user on an authentication device 101. Before the user carry out any active step a software program 110, user device communication module, is running on the client computer 102. The user device communication module is configured to exchange data between the authentication device 101 and a service provider application 111 (in browser or apps) on the client computer 102. Following is a step-by-step presentation of a user authentication according to the present invention.

210: The user on his authentication device 101 uses the input 104 to select on the output screen 105 a service provider to which he wants to log in 210.

220: The user authenticates to the authentication device 220.

230: The authenticating device 101 sends/communicates to the client computer a message 230 containing the service provider credentials and the users' user credentials for the selected service provider (username, password, and possibly other authentication factors like OTP, fingerprint or other generated on the authenticating device 101).

240: The message 230 includes commands for the client computer 102 to open an online application of the service provider 103a, 103b (e.g. in a browser or dedicated application).

250: The client computer forwards the user credential information as requested by the service provider application 111 from the client computer to the service provider.

260: The service provider 103a, 103b verifies the user credentials.

270: The service provider 103a, 103b establishes a secure session to the users account on the client computer 102.

Figure 5:
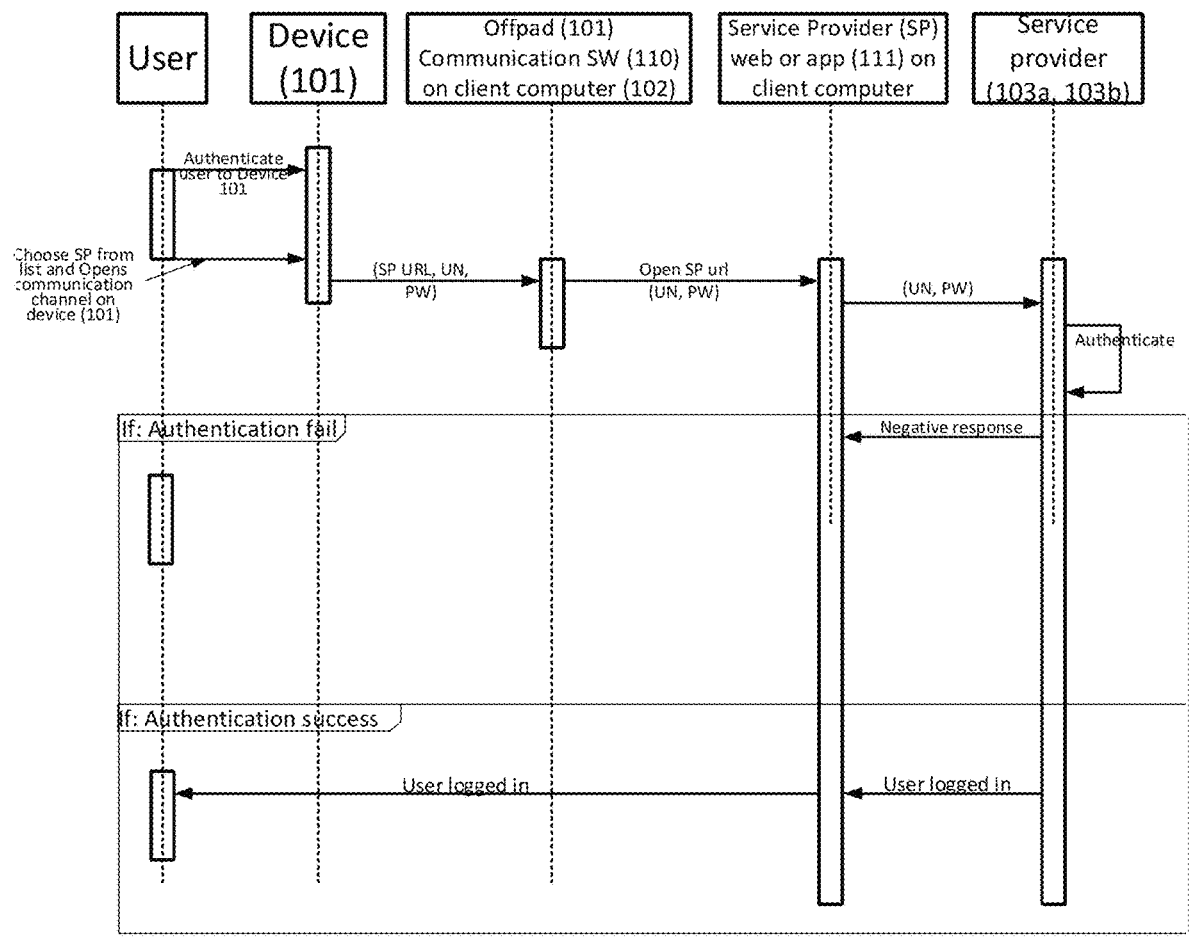
FIG. 5 shows details with respect to signalling between a user, an authentication device, a client computer and a service provider.
Figure 6:
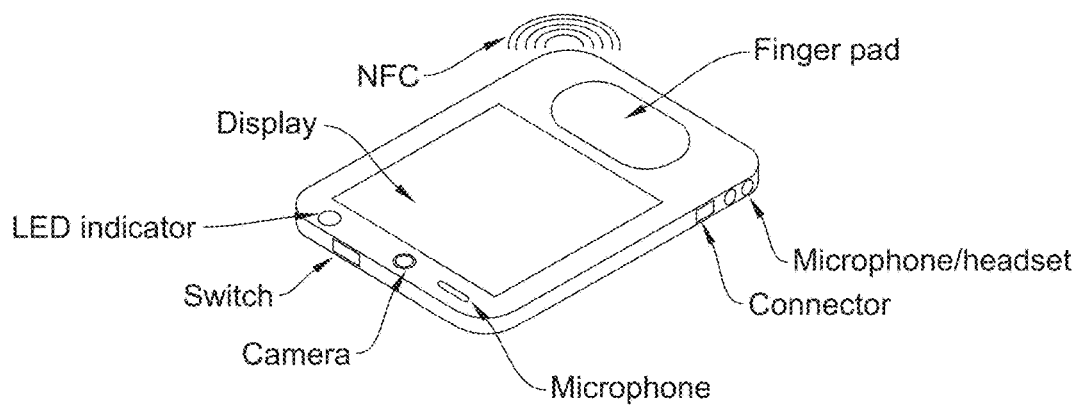
FIG. 6 shows an example of an authenticating device according to one embodiment of the present invention.

FIG. 5 shows a signalling and data traffic scheme between elements in an authentication system for authentication of a user to a user selected service provider 103a, 103b comprising a user, an authentication device 101, communication applications 110 on a client computer 102, a service provider web or application 111 on the client computer 102 and a service provider 103a, 103b. It shall be noted that an initialisation procedure has been carried out before this authentication finds place, thus user credentials, device credentials and lists of service providers etc. is already established.

Step 1: In a first step the user authenticates himself on an authentication device 101. This step is carried out by the user entering data to the authentication device. The data can be biometric parameters from fingerprint sensors, iris detectors etc. The biometric sensors are in communication with the authentication device 101. The data can be entered on a keyboard as numeric, alphanumeric or symbolic characters or a combination thereof. Also biometric data can be combined with manually entered data on a keyboard. It shall be understood that the keyboard can be any input device capable of receiving numeric, alphanumeric or symbolic characters or a combination thereof. Typically this can be a touch screen with a GUI for input of characters.

Step 2: In a second step the user selects a service provider from a list displayed on a displaying means of the authentication device 101.

Step 3: In a third step the authentication device 101 forwards data to a client computer 102 entered by the user and data associated with entered data which is stored on the authentication device 101, such as service provider 103a, 103b credentials which is stored in the authentication device after previous steps where the user has selected service providers. Typical data that is sent to the client computer at least comprises, service provider URL, UN, Password etc. The client computer 102 is configured to communicate with the authentication device 101 as a communication software 110 is already installed and running on the client computer 102.

Step 4: In a fourth step the data received by the communication software 110 is sent to an application 111 on the client computer 102. The application 111 is a service provider web or application which is configured to extract data received from the communication software 110 and to use the extracted data to select a service provider (URL) and forward credentials for authentication and login at the service provider 103a, 103b.

Step 5: In a fifth step a selected service provider 103a, 103b is accessed using the associated URL, Username (UN) and Password (PW) which carries necessary user credential and client computer credentials to be authenticated at the selected service provider.

Step 6: At the service provider the received data is analysed, i.e. checked against tables wherein a list of users is associated with credentials, user passwords, biometrics etc. If there is a match in the tables, authentication is true and the login procedure between the client computer 102 and the service provider 103a, 103b can commence. Success is showed at the bottom of FIG. 5 under a tab named "If: Authentication success". Steps related to authentication failure can be found above the "Authentication success steps in FIG. 5. The authentication success steps commence in step 8.

Step 7: Authentication failure leads to generation of a negative response at the service provider 103a, 103b. The negative response is sent to the service provider web or application 111 on the client computer 102.

Step 8: Under the tab "If: Authentication success" in FIG. 5 login steps is showed. The service provider sends a login confirmation to the service provider web or application 111 on the client computer 102.

Step 9: The service provider web or application 111 on the client computer 102 establishes a session with the service provider 103a, 103b on the client computer 102, i.e. the user is logged in at the service provider 103a, 103b.

The steps 1-9 is described in table 1 below.

TABLE 1

| | | |
|---|---|---|
| 0 | Assuming client computer (CC) has the Comm SW for the device according to the present invention installed and user has completed 'First time use at Service Provider (SP)'. Ref. FIG. 2 and 3. | |
| 1 | On authenticating device 101, the user scrolls down list of SPs, and | |
| 2 | presses SP name or 'login'-button. (User authenticates to authenticating device 101 through Biometric fingerprint simultaneously) | A message with un + pw is generated in the authenticating device 101 device and is ready to be sent to CC. |

TABLE 1-continued

| | | |
|---|---|---|
| 3 | User instructs the authenticating device 101 to send message to CC (for example by tapping the authenticating device 101 into a CC) | The authenticating device 101 device sends the message to CC which opens the SP login service and sends the user credentials to the SP. |
| 4 | On the CC screen, the SP is opened in the browser or App, with the user logged in to her account | The SP authenticates the user and opens the logged-in session on the CC. SP uses value if subscribed to. |

ADVANTAGES OF THE INVENTION

The method according to the present invention facilitates establishing by the user a secure session with a service provider without physical intervention on the client computer. The advantages are potentially significant for persons with physical disabilities, whom otherwise will have problems, or not being able, to access online services.

The authenticating device 101 offers a trusted secure computing environment that is independent from the mobile/PC computing platform that is always assumed to be infected by stealthy malware. Hence, transactions originating from the authenticating device 101 can act as a forensic evidence to prove that the origin was the user and not a malware.

The authenticating device 101 provides the necessary security level required by many industries that deal with sensitive data (health, banking etc.), without compromising the usability of their digital services. This means that new innovative services can be offered to citizens and customers, since the security level offered by the authenticating device 101 would allow them to digitize more workflows while remaining compliant.

The authenticating device 101 can integrate with a multitude of service providers, without the need to change the configuration of the infrastructure at the service provider side. This democratises the security for all service providers, regardless of their size and/or maturity level.

Figure 7:
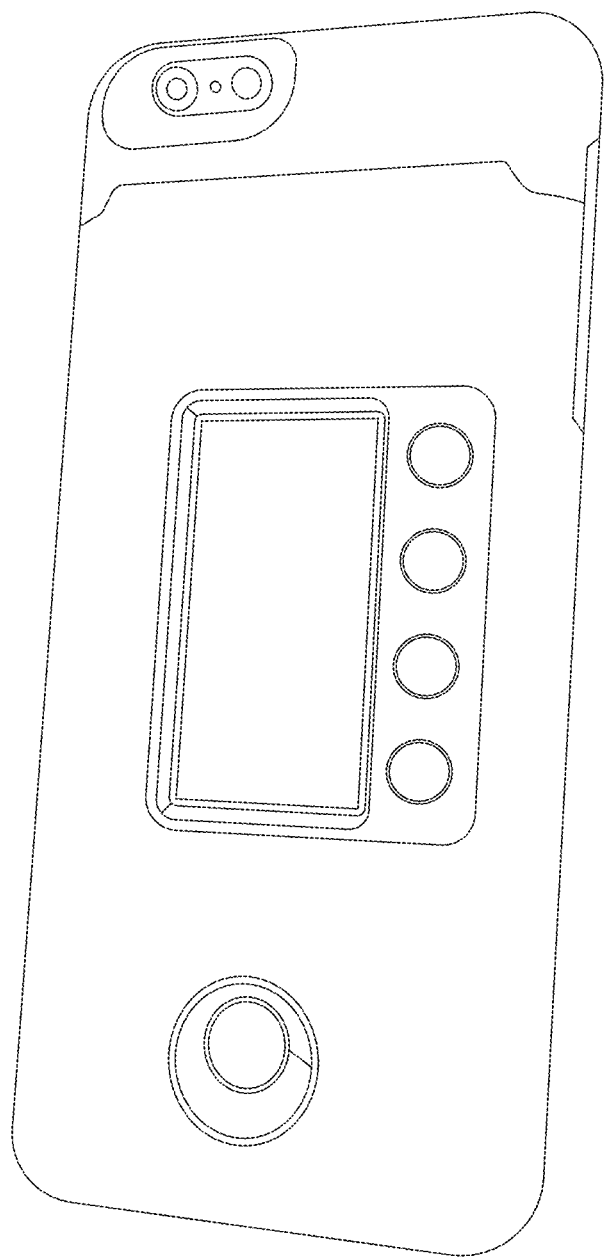
FIG. 7 shows an example of an authentication device according to an embodiment of the present invention materialised as a smart phone cover.
Figure 8:
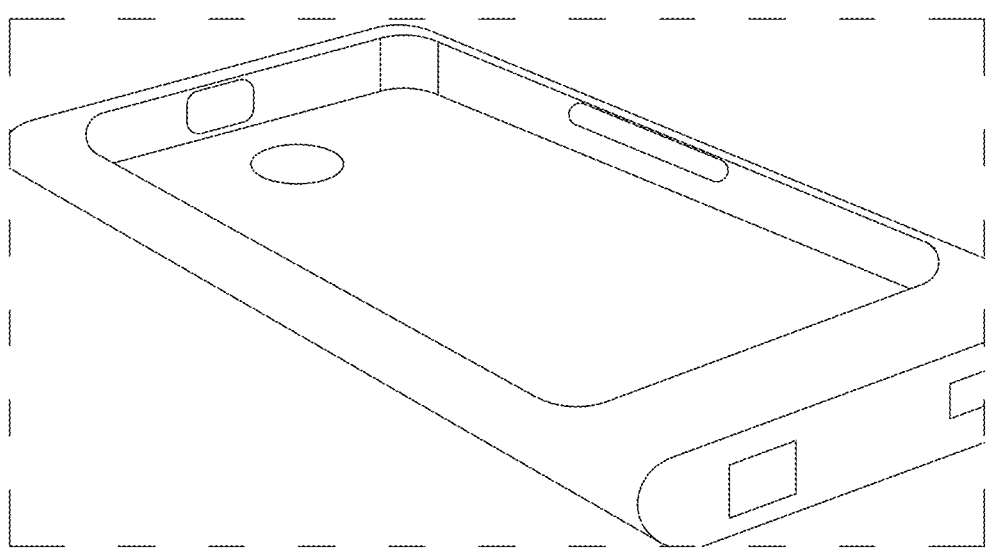
FIG. 8 shows an example of an authentication device according to an embodiment of the present invention materialised as a smart phone cover.

The authenticating device 101 can be implemented as for example a mobile phone cover which attaches to a mobile phone (FIG. 7 and FIG. 8). The cover includes all elements mentioned above such as processors memories etc.

REFERENCES

| | |
|---|---|
| OTP | One time password |
| PW | Password |
| URL | Uniform Resource Locator (URL), colloquially termed a web address is a reference to a web resource that specifies its location on a computer network |
| CC | Client computer |
| SW | Software |
| SP | Service provider |
| HTTP | Hypertext Transfer Protocol |
| PKI | Public Key Infrastructure |
| Petname | A security-enhancing software naming systems. Petname systems are naming systems that claim to be - global, secure, and memorable. |
| Digipass | Can either be an application which generates one time codes used to securely access services, or it can be a physical authentication device. The device is PIN protected and when the PIN and transaction details are used the device generates a unique code each time it is used and this code is valid for a set period. |
| Smart Card | Smart card, is any pocket-sized card that has embedded integrated circuits. |
| USB | USB, short for Universal Serial Bus, is an industry standard that defines cables, connectors and communications protocols for connection, communication |
| UN | User name |
| Vm-client | Virtual machine client |
| NFC | Near-field communication is a set of communication protocols enabling two electronic devices, to establish communication by bringing them close together. |
| LAN | Local Area Network |
| BT | Bluetooth |
| TLS | Transport Layer Security, cryptographic protocol |
| SSL | Secure socket layer, cryptographic protocol |
| Online | In the context of this patent application online means being connected to the internet if not otherwise is explicitly indicated |
| Offline | In the context of this patent application offline means not being connected to the internet if not otherwise is explicitly indicated |
| 101 | Authentication device, device, user device |
| 102 | Client computer, CC, |
| 103a, 103b | Service provider |
| 104 | Input, input data means, keyboard, biometric sensor(s). |
| 105 | Output, display, output data means, display screen. |
| 106 | Memory |
| 107 | Processor |
| 108 | Input interface of client computer |
| 109 | Output display means of client computer, an output interface of the client computer. |
| 110 | User device communication module on the client computer, communication software on the client computer |
| 111 | Application on the client computer, service provider applications on client computer, service provider web or application on the client computer |
| 112 | Internet connection means (112) |
| [OffPAD] | Kent A. Varmedal et al: "The OffPAD: Requirements and Usage." OffPAD Requirements and usage" Department of Informatics, University of Oslo, June 2013. " |

The invention claimed is:

1. An authentication method for a user to access service providers through an online enabled device without physically interacting on the online enabled device where an initialisation procedure has been carried out before an authentication method takes place, comprising the steps of:
   a) providing a non-Internet enabled authentication device that is not connected to the Internet and communicates only with the online enabled device via short-range wireless technology;
   b) entering biometric data to the non-Internet enabled authentication device via biometric sensors which authenticates the user to the non-Internet enabled authentication device;
   c) providing a communication module to the online enabled device where the communication module communicates with the non-Internet enabled authentication device;
   d) selecting by the user a service provider from a list using input interface on the non-Internet enabled authentication device;
   e) forwarding data associated with the selected service provider to the communication module from the non-Internet enabled authentication device, where the data associated with the service provider has been stored on the non-Internet enabled authentication device in the initialisation procedure and where the data associated with the selected service provider comprises credentials for the selected service providers;
   f) sending the data received by the communication module to the service provider from a web browser or applications on the online enabled device;

g) on the service provider executing an authentication procedure based on the data received by the communication module; and h) logging in the user on the service provider.

2. The method according to claim 1, wherein an intermediate step following step d) further comprises the subsequent steps of:
triggering an access command on the non-Internet enabled authentication device to access the online enabled device.

3. The method according to claim 1, wherein a subsequent and intermediate step of step d) further comprise the step of: the user selecting "register user" on a menu on the non-Internet enabled authentication device.

4. The method according to claim 3, wherein the subsequent steps further comprise the step of, at the non-Internet enabled authentication device: storing the user input in the memory of the non-Internet enabled authentication device.

5. The method according to claim 1, wherein step D further comprises the subsequent step of:
generating from a service provider from a web browser on the online enabled devices or from applications on the online enabled devices a service provider request message.

6. The method according to claim 1, wherein step f further comprises sending the request message to open the service provider web address, from the non-Internet enabled authentication device, where the message includes service provider web address, username (UN) and password (PW).

7. The method according to claim 1, where the online enabled device can be a smart phone or a computer.

8. The method according to claim 1, where step e) further comprises the step of forwarding biometric data to the communication module from the non-Internet enabled authentication device.

9. The method according to claim 1, wherein the initialisation procedure includes personalising the non-Internet enabled authentication device and registering data associated with the service providers on the non-Internet enabled authentication device, the personalising includes requesting the user to enter user credentials for authenticating the user to the non-Internet enabled authentication device and storing the user credentials in the non-Internet enabled authentication device, the data associated with the service providers are user credentials and service provider credentials for the services to which the user wants to log-in.

10. The method according to claim 9, wherein the user credentials for the service provider include a username and a password, and the service provider credentials include service provider web addresses.

11. The method according to claim 9, wherein the non-Internet enabled authentication device is personalised to multiple users.

12. The method according to claim 9, wherein registering the user credentials and service provider credentials is repeated for each service provider.

13. The method according to claim 1, wherein the user authenticates to the non-Internet enabled authentication device before the non-Internet enabled authentication device sends information to the Internet enabled device.

14. A non-Internet enabled authentication device configured to authenticate a user to service providers through online enabled devices without physically interacting on the online enabled devices and where an initialisation procedure has been carried out before authentication takes place using an authentication method, where the non-Internet enabled authentication device, comprises:

a) an input interface configured to select by a user a service provider from a list, b) at least one biometric sensor configured to authenticate the user to the non-Internet enabled authentication device, c) an output interface, d) a memory, and e) a processor, wherein the memory holds a list of service providers and the output interface includes online enabled device communication means configured for transfer of at least an address of a service provider and authentication credentials associated with the service provider.

15. The non-Internet enabled authentication device according to claim 14, where the input interface can be one or more of: a keyboard with real mechanical keys, a keyboard with soft keys and a touch screen.

16. The non-Internet enabled authentication device according to claim 14, wherein the biometric sensor can be an iris sensor, fingerprint sensors or a microphone.

17. The non-Internet enabled authentication device according to claim 14, wherein the output interface at least comprises one of: display units, touch screens, loudspeaker or LED's.

18. The non-Internet enabled authentication device according to claim 14, wherein the memory is an insertable memory chip.

19. The non-Internet enabled authentication device according to claim 18, wherein the memory is configured to store lists of service providers with associated credentials and to store user credentials and user credential associated with individual service providers.

20. The non-Internet enabled authentication device according to claim 14, wherein the processor is configured to process data and to route data between I/O-units and to communicate with the online enabled device.

21. A user authentication system comprising a non-Internet enabled authentication device, an online enabled device and online service providers, where:

a) the non-Internet enabled authentication device is configured to authenticate a user to service providers through the online enabled device without physically interacting on the online enabled device and where an initialisation procedure has been carried out before the use of an authentication method, where the non-Internet enabled authentication device at least comprises:

i) an input interface configured to select by a user a service provider from a list, ii) at least one biometric sensor configured to authenticate the user to the non-Internet enabled authentication device, iii) an output interface, iv) a memory, and v) a processor, wherein the memory holds a list of service providers and the output interface includes short-range wireless technology communication transferring at least an address of a service provider and authentication credentials associated with the service; and b) the online enabled device at least comprises an input interface, an output interface, a user non-Internet enabled authentication device communication module, service provider applications, and Internet connection means.

22. The user authentication system according to claim 21, wherein the input interface can be one or more of: a keyboard with real mechanical keys, a keyboard with soft keys or a touch screen.

23. The user authentication system according to claim 21, wherein
the biometric sensors can be an iris sensor, a fingerprint sensor or a microphone.

24. The user authentication system according to claim 21, wherein the output device at least comprises one of: display units, touch screens, loudspeaker or LED's.

25. The user authentication system according to claim 21, wherein the processor is configured to process data and to route data between I/O-units and to communicate with online enabled device.

\* \* \* \* \*